United States Patent
Maeda et al.

(10) Patent No.: US 10,408,322 B2
(45) Date of Patent: Sep. 10, 2019

(54) LOCK-UP DEVICE FOR TORQUE CONVERTER

(71) Applicant: EXEDY Corporation, Neyagawa-shi, Osaka (JP)

(72) Inventors: Kazuhito Maeda, Neyagawa (JP); Keiichi Yasuda, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 52 days.

(21) Appl. No.: 15/567,476

(22) PCT Filed: May 18, 2016

(86) PCT No.: PCT/JP2016/064706
§ 371 (c)(1),
(2) Date: Oct. 18, 2017

(87) PCT Pub. No.: WO2016/186125
PCT Pub. Date: Nov. 24, 2016

(65) Prior Publication Data
US 2018/0163836 A1  Jun. 14, 2018

(30) Foreign Application Priority Data

May 20, 2015 (JP) .................................. 2015-102485
May 20, 2015 (JP) .................................. 2015-102486
(Continued)

(51) Int. Cl.
*F16H 45/02* (2006.01)
*F16D 25/08* (2006.01)
(Continued)

(52) U.S. Cl.
CPC ............. *F16H 45/02* (2013.01); *F16D 13/40* (2013.01); *F16D 25/0635* (2013.01);
(Continued)

(58) Field of Classification Search
None
See application file for complete search history.

(56) References Cited

U.S. PATENT DOCUMENTS

| 5,127,503 | A | 7/1992 | Gratzer | |
|---|---|---|---|---|
| 6,367,605 | B1 * | 4/2002 | Middelmann | F16H 45/02 192/103 FA |

(Continued)

FOREIGN PATENT DOCUMENTS

| CN | 104204616 A | 12/2014 |
|---|---|---|
| CN | 105339706 A | 2/2016 |

(Continued)

OTHER PUBLICATIONS

Decision of Grant of the corresponding Japanese patent application No. 2015-102488, dated Jan. 8, 2019, 3 pp.

(Continued)

*Primary Examiner* — Mark A Manley
(74) *Attorney, Agent, or Firm* — United IP Counselors, LLC

(57) ABSTRACT

A lock-up device includes a clutch disc, a piston, a temperature detection member and a gap adjustment mechanism. The clutch disc is disposed between a front cover and a turbine. The piston is disposed in opposition to the front cover through the clutch disc so as to be movable in an axial direction, and presses the clutch disc toward the front cover. The deformation amount of the temperature detection member is adjusted in accordance with surrounding temperatures. In accordance with the deformation amount, the gap adjustment mechanism adjusts a gap between the front cover and the piston to be a first gap at a first temperature. Further, in accordance the deformation amount, the gap adjustment mechanism adjusts the gap between the front cover and the (Continued)

piston to be a second gap narrower than the first gap at a second temperature higher than the first temperature.

7 Claims, 8 Drawing Sheets

(30) Foreign Application Priority Data

May 20, 2015 (JP) ................................ 2015-102487
May 20, 2015 (JP) ................................ 2015-102488

(51) Int. Cl.
*F16H 41/24* (2006.01)
*F16D 25/0635* (2006.01)
*F16D 13/40* (2006.01)
*F16F 15/121* (2006.01)

(52) U.S. Cl.
CPC ........... *F16D 25/082* (2013.01); *F16H 41/24* (2013.01); *F16F 15/1216* (2013.01); *F16H 2045/0205* (2013.01); *F16H 2045/0215* (2013.01); *F16H 2045/0221* (2013.01); *F16H 2045/0294* (2013.01)

(56) References Cited

U.S. PATENT DOCUMENTS

| | | | |
|---|---|---|---|
| 2005/0211523 A1* | 9/2005 | Takahashi | F16H 45/02 192/3.29 |
| 2015/0008086 A1 | 1/2015 | Mototsune | |

FOREIGN PATENT DOCUMENTS

| | | |
|---|---|---|
| DE | 4121555 A1 | 1/1992 |
| JP | S5533949 A | 3/1980 |
| JP | S5794164 A | 6/1982 |
| JP | H04249619 A | 9/1992 |
| JP | H09126275 A | 5/1997 |
| JP | H09229159 A | 9/1997 |
| JP | 2001065664 A | 3/2001 |
| JP | 2005-282617 A | 10/2005 |
| JP | 2010216529 A | 9/2010 |
| JP | 2011190845 A | 9/2011 |
| JP | 2012211707 A | 11/2012 |
| JP | 2013217452 A | 10/2013 |
| JP | 2015017671 A | 1/2015 |
| KR | 1020140144678 A | 12/2014 |
| KR | 1020160032091 A | 3/2016 |
| WO | 2013154065 A1 | 10/2013 |
| WO | 2015005379 A1 | 1/2015 |

OTHER PUBLICATIONS

International Search Report dated Aug. 23, 2016 for foreign Application No. PCT/JP2016/064793, 1 pp.
International Search Report dated Jul. 5, 2016 for corresponding foreign Application No. PCT/JP2016/064706, 1 pp.
International Search Report dated Jul. 5, 2016 for foreign Application No. PCT/JP2016/064707, 2 pp.
International Search Report dated Aug. 9, 2016 for foreign Application No. PCT/JP2016/064794, 2 pp.
U.S. Appl. No. 15/567,672, filed Oct. 19, 2017, Exedy Corporation.
U.S. Appl. No. 15/567,757, filed Oct. 19, 2017, Exedy Corporation.
U.S. Appl. No. 15/567,784, filed Oct. 19, 2017, Exedy Corporation.

* cited by examiner (a)

(b)

LOCK-UP DEVICE FOR TORQUE CONVERTER

CROSS-REFERENCE TO RELATED APPLICATIONS

This application is the U.S. National Phase of PCT International Application No. PCT/JP2016/064706, filed on May 18, 2016. That application claims priority to Japanese Patent Application No. 2015-102485, filed on May 20, 2015, Japanese Patent Application No. 2015-102486, filed on May 20, 2015, Japanese Patent Application No. 2015-102487, filed on May 20, 2015, and Japanese Patent Application No. 2015-102488, filed on May 20, 2015. The contents of all five applications are herein incorporated by reference in their entirety.

BACKGROUND

Technical Field

The present disclosure relates to a lock-up device, and particularly to a lock-up device for a torque converter, which transmits a torque from a front cover to a transmission-side member through a turbine of the torque converter.

Background Information

Torque converters are often equipped with a lock-up device that directly transmits a torque from a front cover to a turbine. The lock-up device described in Japan Laid-open Patent Application Publication No. H09-229159 includes a clutch part disposed between the front cover and the turbine and a piston disposed between the clutch part and the turbine.

The clutch part includes a hub fixed to the front cover, a clutch disc engaged with the hub, and a clutch drum coupled to the turbine. Additionally, a driven plate and a retainer plate are engaged with the clutch drum so as to interpose the clutch disc therebetween.

The piston is axially movable, and causes the driven plate and the retainer plate to interpose and hold the clutch disc therebetween whereby a lock-up on state (a power transmission activated state) is made. A bimetal plate having a disc shape is disposed sideward of the piston. At a temperature greater than a set temperature, the bimetal plate deforms so as not to make contact with the piston, and hence, does not affect the piston to be actuated by hydraulic pressure. On the other hand, at a temperature less than or equal to the set temperature, the bimetal plate deforms so as to press the piston in a direction that a lock-up off state (a power transmission deactivated state) is made.

BRIEF SUMMARY

In the device of Japan Laid-open Patent Application Publication No. H09-229159, with the bimetal plate provided, a clutch gap increases in size at low temperatures and reduces in size at normal temperatures. Therefore, drag torque can be reduced in magnitude at low temperatures.

However, the device of Japan Laid-open Patent Application Publication No. H09-229159 has a drawback of lack of flexibility in design because of limitations inevitably imposed on the place for disposing the bimetal plate.

It is an object of the present disclosure to make a gap of a clutch part appropriately settable in accordance with temperatures, and in addition, to enhance flexibility in design of a mechanism for appropriately setting the gap of the clutch part.

(1) A lock-up device for a torque converter according to an aspect of the present disclosure is a device for transmitting a torque from a front cover to a transmission-side member through a turbine of the torque converter. The present lock-up device includes a clutch disc, a piston, a temperature detection member and a gap adjustment mechanism. The clutch disc is disposed between the front cover and the turbine. The piston is disposed in opposition to the front cover through the clutch disc so as to be movable in an axial direction, and presses the clutch disc toward the front cover. A deformation amount of the temperature detection member is adjusted in accordance with surrounding temperatures. In accordance with the deformation amount of the temperature detection member, the gap adjustment mechanism adjusts a gap between the front cover and the piston to be a first gap at a first temperature, and adjusts the gap between the front cover and the piston to be a second gap narrower than the first gap at a second temperature higher than the first temperature.

In the present device, the clutch disc is disposed between the front cover and the piston, and a lock-up on state is made when the clutch disc is pressed toward the front cover by the piston. On the other hand, the piston has been moved in a direction separating from the front cover when a lock-up off state is made, whereby the clutch disc is not being pressed toward the front cover.

When the lock-up off state is made, at the first temperature that is relatively low, the gap adjustment mechanism is actuated in accordance with the deformation amount of the temperature detection member, and the gap between the front cover and the piston is set to be the first gap that is relatively wide. Therefore, a drag torque to be generated by the clutch disc disposed between the front cover and the piston can be reduced in magnitude. On the other hand, at the second temperature (e.g., normal temperature) higher than the first temperature, the gap adjustment mechanism is actuated in accordance with the deformation amount of the temperature detection member, and the gap between the front cover and the piston is set to be the second gap narrower than the first gap. Therefore, responsiveness becomes better in transitioning from the lock-up off state to the lock-up on state.

Here, the gap adjustment mechanism is provided separately from the temperature detection member. Limitations are not imposed on the layout of the temperature detection member such as a bimetal. Therefore, flexibility in design is enhanced.

(2) Preferably, the temperature detection member and the gap adjustment mechanism are disposed between the front cover and the piston.

(3) Preferably, the present device further includes an oil chamber plate disposed between the piston and the turbine. Additionally, the piston and the oil chamber plate form a lock-up oil chamber therebetween, and the lock-up oil chamber is supplied with a hydraulic oil for moving the piston toward the front cover.

Here, the piston is actuated by supplying the hydraulic oil to the lock-up oil chamber, whereby the lock-up on state can be quickly made.

(4) Preferably, the front cover and the piston form a cancellation oil chamber therebetween so as to cancel a hydraulic pressure to be generated in the lock-up oil chamber in lock-up releasing. Additionally, the temperature detection member and the gap adjustment mechanism are disposed in the cancellation oil chamber.

(5) Preferably, the present device further includes a support boss having an annular shape. The support boss is fixed to an inner peripheral part of the front cover, and includes a piston support part and a coupling part. The piston support part supports an inner peripheral end surface of the piston such that the piston is slidable thereon. The coupling part receives an inner peripheral part of the oil chamber plate coupled thereto. Additionally, the support boss includes an oil passage communicated with the lock-up oil chamber and an oil passage communicated with the cancellation oil chamber.

(6) Preferably, the front cover includes a friction surface with which the clutch disc is pressed in contact. Additionally, the present device preferably further includes a pressure plate that is disposed in opposition to the friction surface through the clutch disc and is pressed by the piston.

(7) Preferably, the present device further includes a damper mechanism that transmits the torque from the clutch disc to the turbine, and also, absorbs and attenuates a torsional vibration.

According to the above, a gap of a clutch part can be appropriately set in accordance with temperatures, and in addition, flexibility in design of a mechanism for appropriately setting the gap of the clutch part can be enhanced.

DETAILED DESCRIPTION OF EMBODIMENTS

Entire Configuration of Torque Converter

Figure 1:
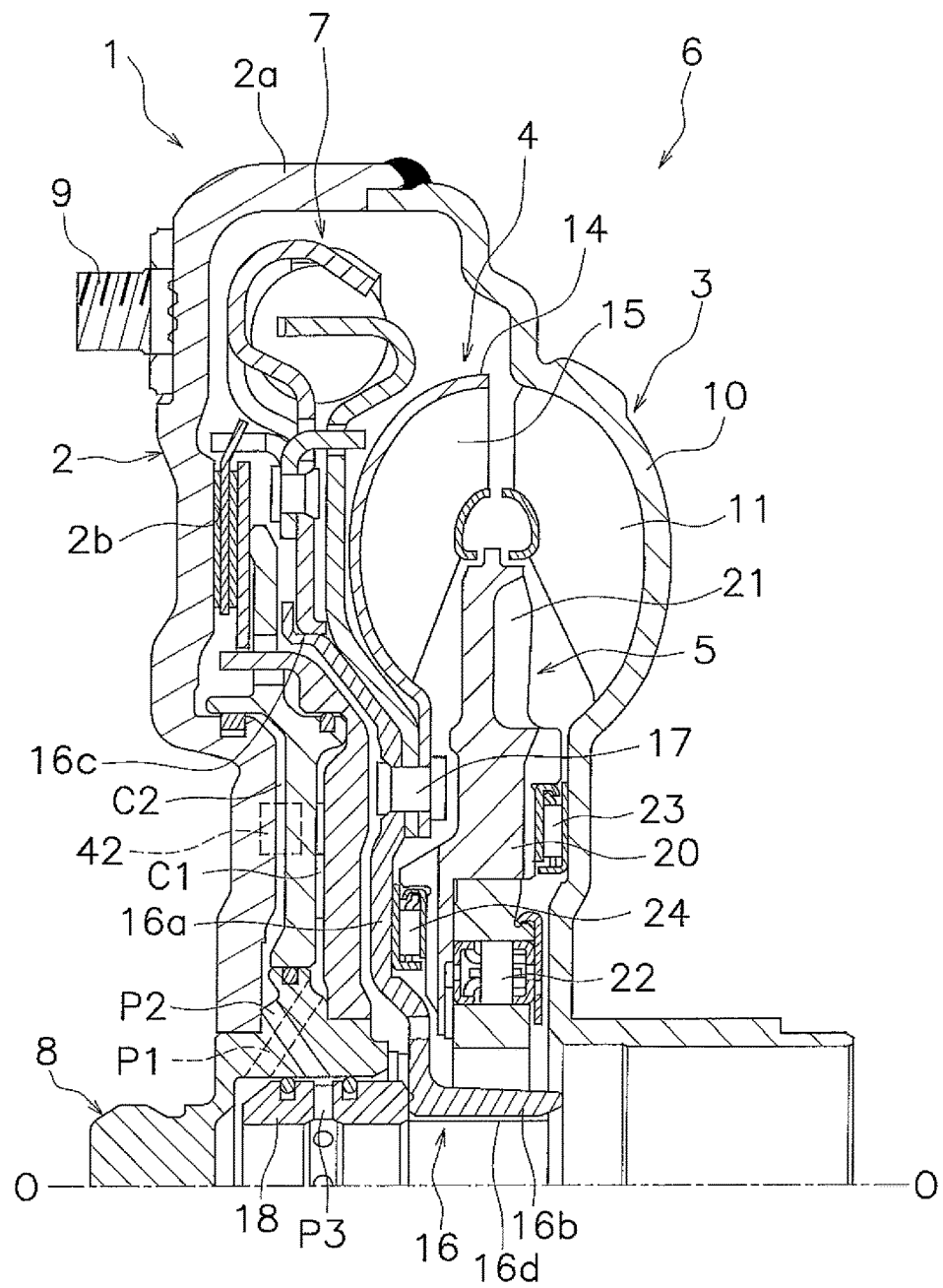
FIG. 1 is a cross-sectional configuration diagram of a torque converter including a lock-up device according to an exemplary embodiment of the present disclosure.

FIG. 1 is a vertical cross-sectional view of a torque converter 1 employing an exemplary embodiment of the present disclosure. The torque converter 1 is a device that transmits a torque from a crankshaft of an engine to an input shaft of a transmission. In FIG. 1, the engine (not shown in the drawing) is disposed on the left side, whereas the transmission (not shown in the drawing) is disposed on the right side. Line O-O depicted in FIG. 1 is a rotational axis of the torque converter 1.

The torque converter 1 mainly includes a front cover 2, a torque converter body 6 composed of three types of bladed wheels (an impeller 3, a turbine 4 and a stator 5) and a lock-up device 7.

Front Cover 2

The front cover 2 is a disc-shaped member and a center boss 8 is fixed to the inner peripheral end of the front cover 2 by welding. The center boss 8 is a cylindrical member extending in the axial direction, and is inserted into a center hole of the crankshaft (not shown in the drawings).

It should be noted that the front cover 2 is configured to be coupled to the crankshaft of the engine through a flexible plate, although the configuration is not shown in the drawings. In other words, a plurality of bolts 9 are fixed to the engine-side surface of the outer peripheral part of the front cover 2, while being aligned at equal intervals in the circumferential direction. The outer peripheral part of the flexible plate is fixed to the front cover 2 by nuts screwed onto the bolts 9.

The front cover 2 includes an outer peripheral side tubular part 2a in the outer peripheral part thereof. The outer peripheral side tubular part 2a extends axially toward the transmission. The impeller 3 is fixed to the distal end of the outer peripheral side tubular part 2a by welding. As a result, a fluid chamber, the interior of which is filled with hydraulic oil, is formed by the front cover 2 and the impeller 3.

Additionally, the front cover 2 includes a flat part 2b having an annular shape on the turbine-side lateral surface of the radially intermediate part thereof. The flat part 2b is shaped to protrude toward the turbine than parts located on the inner and outer peripheral sides thereof. The surface of the flat part 2b functions as a friction surface (the flat part 2b will be hereinafter referred to as "friction surface 2b").

Impeller 3

The impeller 3 is mainly composed of an impeller shell 10 and a plurality of impeller blades 11 fixed to the inside of the impeller shell 10. Additionally, the outer peripheral side distal end of the impeller shell 10 is welded to the front cover 2 as described above. It should be noted that the impeller shell 10 includes a tubular part in the inner peripheral end thereof. The tubular part extends toward the transmission.

Turbine 4

The turbine 4 is disposed in axial opposition to the impeller 3 within the fluid chamber. The turbine 4 is mainly composed of a turbine shell 14, a plurality of turbine blades 15 fixed to the inside of the turbine shell 14, and a turbine hub 16 fixed to the inner peripheral end of the turbine shell 14. The turbine shell 14 and the turbine hub 16 are fixed by a plurality of rivets 17.

The turbine hub 16 includes a flange part 16a, a tubular part 16b and a damper support part 16c. The flange part 16a is a disc-shaped part to which the inner peripheral end of the turbine shell 14 is fixed. The tubular part 16b is shaped to extend from the inner peripheral part of the flange part 16a toward the transmission. The tubular part 16b includes a spline hole 16d in the inner peripheral part thereof, and the spline hole 16d is capable of being meshed with a spline shaft provided on the tip of the input shaft of the transmission (not shown in the drawings). The damper support part 16c is formed by extending the outer peripheral part of the flange part 16a. The damper support part 16c will be described below in detail.

A collar 18 is fixed to the inner peripheral end of the turbine hub 16 on the opposite side (the engine side) of the tubular part 16b. On the inner peripheral end of the turbine hub 16, the collar 18 extends toward the engine from approximately the same radial position as the tubular part 16b.

Stator 5

The stator 5 is a mechanism disposed between the inner peripheral part of the impeller 3 and that of the turbine 4 so as to regulate the flow of hydraulic oil returning from the turbine 4 to the impeller 3. The stator 5 is made by integral casting of resin, aluminum alloy or so forth. The stator 5 mainly includes a stator shell 20 having a disc shape and a plurality of stator blades 21 integrated with the stator shell 20 on the outer peripheral side of the stator shell 20. The stator shell 20 is coupled to a stationary shaft (not shown in the drawings) through a one-way clutch 22.

A thrust bearing 23 is disposed between the stator shell 20 and the impeller shell 10, whereas a thrust bearing 24 is disposed between the stator shell 20 and the flange part 16a of the turbine hub 16.

Lock-Up Device 7

The lock-up device 7 is a device disposed between the front cover 2 and the turbine 4 so as to directly transmit power from the front cover 2 to the turbine 4. As shown close-up in FIG. 2, the lock-up device 7 includes a clutch disc 28, a pressure plate 29, a piston 30, a piston actuation mechanism 31 and a damper mechanism 34.

<Clutch Disc 28>

The clutch disc 28 has an annular shape and is capable of being pressed in contact with the friction surface 2b of the front cover 2. The clutch disc 28 includes a core plate 36 having an annular shape and friction members 37 that have an annular shape and are fixed to both lateral surfaces of the core plate 36. The core plate 36 has an outer peripheral part larger than the outer diameter of each friction member 37, and is bent at a predetermined angle toward the turbine at a part thereof protruding to the outer peripheral side beyond the friction members 37. Additionally, the bent part includes a plurality of engaging protrusions 36a.

Figure 3:
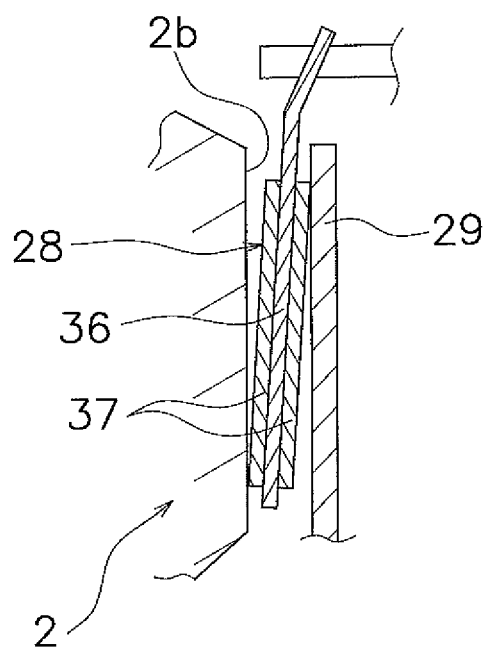
FIG. 3 is a diagram of a clutch disc shown in detail.

Additionally, as shown close-up in FIG. 3, the clutch disc 28 is shaped to tilt in a free state that a lock-up off state (a power transmission deactivated state) is made. Specifically, the clutch disc 28 tilts such that the inner peripheral side part thereof is located closer to the front cover 2 than the outer peripheral side part thereof. Therefore, when the lock-up off state is made, the inner peripheral end of the clutch disc 28 annularly makes line contact with the friction surface 2b of the front cover 2, whereas the outer peripheral end of the clutch disc 28 annularly makes line contact with the pressure plate 29. With the configuration described above, a drag torque is lessened when the lock-up off state is made.

<Pressure Plate 29>

Figure 4:
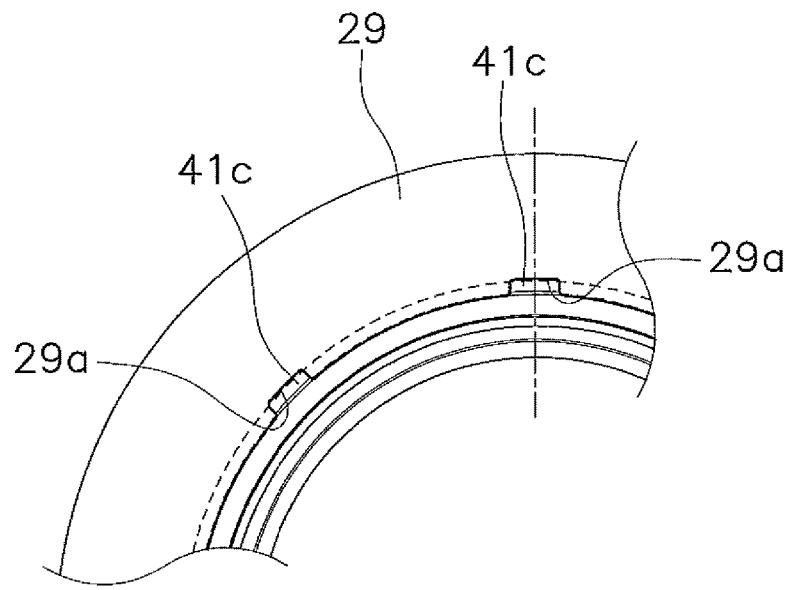
FIG. 4 is a partial front view of an engaging part between a pressure plate and a cover plate.

The pressure plate 29 is disposed between the clutch disc 28 and the piston 30 so as to be movable in the axial direction. The pressure plate 29 is pressed by the piston 30, and thereby presses the clutch disc 28 toward the front cover 2. Additionally, the pressure plate 29 has an annular shape, and the outer diameter thereof is larger than that of each friction member 37 of the clutch disc 28, while the inner diameter thereof is smaller than that of each friction member 37. As shown close-up in FIG. 4, the pressure plate 29 includes a plurality of grooves 29a on the inner peripheral end thereof. The grooves 29a are aligned at predetermined intervals in the circumferential direction. Each groove 29a has a predetermined depth in the radial direction and is opened to the inner peripheral side. It should be noted that FIG. 4 is a view of the pressure plate 29 as seen from the front cover 2 side.

<Piston 30>

Figure 2:
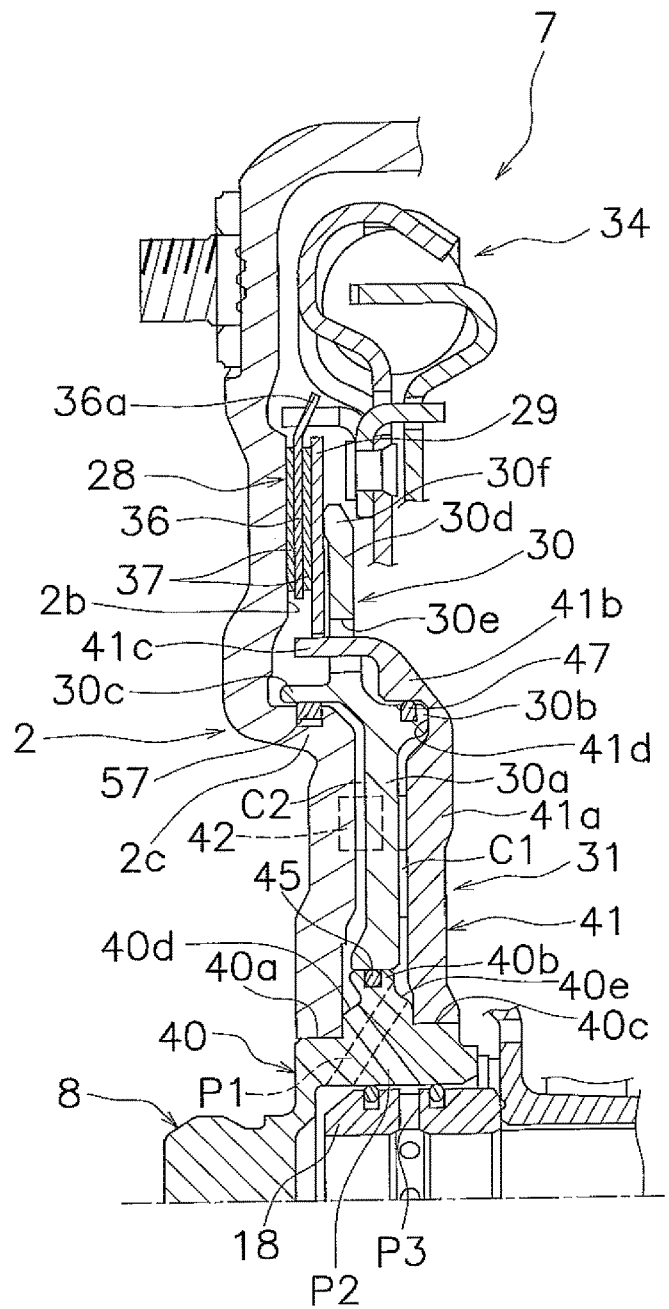
FIG. 2 is a diagram showing part extracted from FIG. 1.

As shown in FIGS. 1 and 2, the piston 30 is disposed between the front cover 2 and the turbine 4 and is movable in the axial direction. The piston 30 includes a pressure receiving part 30a having a disc shape, a first protruding part 30b, a second protruding part 30c and an outer peripheral disc part 30d. It should be noted that the body thereof is composed of the pressure receiving part 30a and the outer peripheral disc part 30d.

The pressure receiving part 30a is a part that receives the pressure of hydraulic oil, and the first protruding part 30b is included in the outer peripheral part of the pressure receiving part 30a so as to protrude toward the turbine 4. The outer peripheral end of the pressure receiving part 30a slantingly extends toward the front cover 2, and the second protruding part 30c is included in the distal end of this slantingly extending part so as to further protrude therefrom toward the front cover 2.

Figure 5:
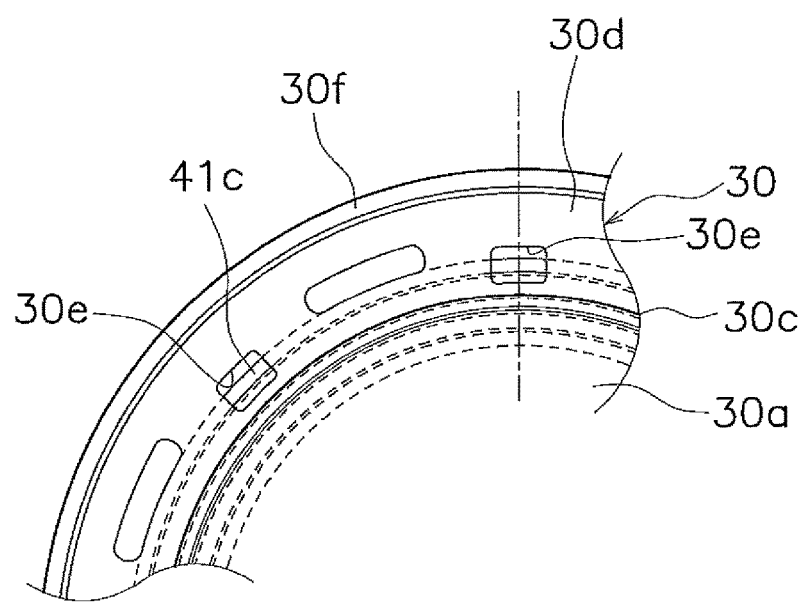
FIG. 5 is a partial front view of an engaging part between a piston and the cover plate.

The outer peripheral disc part 30d is integrated with the pressure receiving part 30a, and is shifted (off-set) to the front cover side with respect to the pressure receiving part 30a. As shown in FIG. 5, the outer peripheral disc part 30d includes a plurality of openings 30e in the inner peripheral part thereof. The openings 30e are aligned at predetermined intervals in the circumferential direction. The plural openings 30e axially penetrate therethrough. It should be noted that FIG. 5 is a view of the piston 30 as seen from the front cover 2 side.

Additionally, the outer peripheral disc part 30d includes a pressure applying part 30f having an annular shape in the outer peripheral end thereof. The pressure applying part 30f is included in the outer peripheral end of the outer peripheral disc part 30d so as to protrude toward the front cover 2. The pressure applying part 30f is shaped to make contact with the approximately middle of the radial width of the pressure plate 29. Preferably, the pressure applying part 30f presses, through the pressure plate 29, a region of one friction member 37 ranging between a position shifted to the inner peripheral side from the middle of the radial width of the friction member 37 by 20% of the radial width and a position shifted to the outer peripheral side from the middle of the radial width of the friction member 37 by 10% of the radial width.

<Stiffness of Core Plate 36, Pressure Plate 29 and Piston 30>

Regarding the bending stiffness of the core plate 36, that of the pressure plate 29, and that of the piston 30, the piston 30 is set to be the highest; the pressure plate 29 is set to be lower than the piston 30; and the core plate 36 is set to be the lowest. The specifications of the core plate 36, the pressure plate 29 and the piston 30 are set as described above. Hence, when pressed by the piston 30 while the front cover 2 (especially, the part thereof including the friction surface 2b) has been deformed, the pressure plate 29 and the clutch disc 28 are supposed to be deformed in accordance with the deformed front cover 2.

<Piston Actuation Mechanism 31>

The piston 30 is axially actuated by the piston actuation mechanism 31. As shown in FIG. 2, the piston actuation mechanism 31 includes a support boss 40, a cover plate 41 (an oil chamber plate) and a return mechanism 42.

—Support Boss 40—

Figure 6:
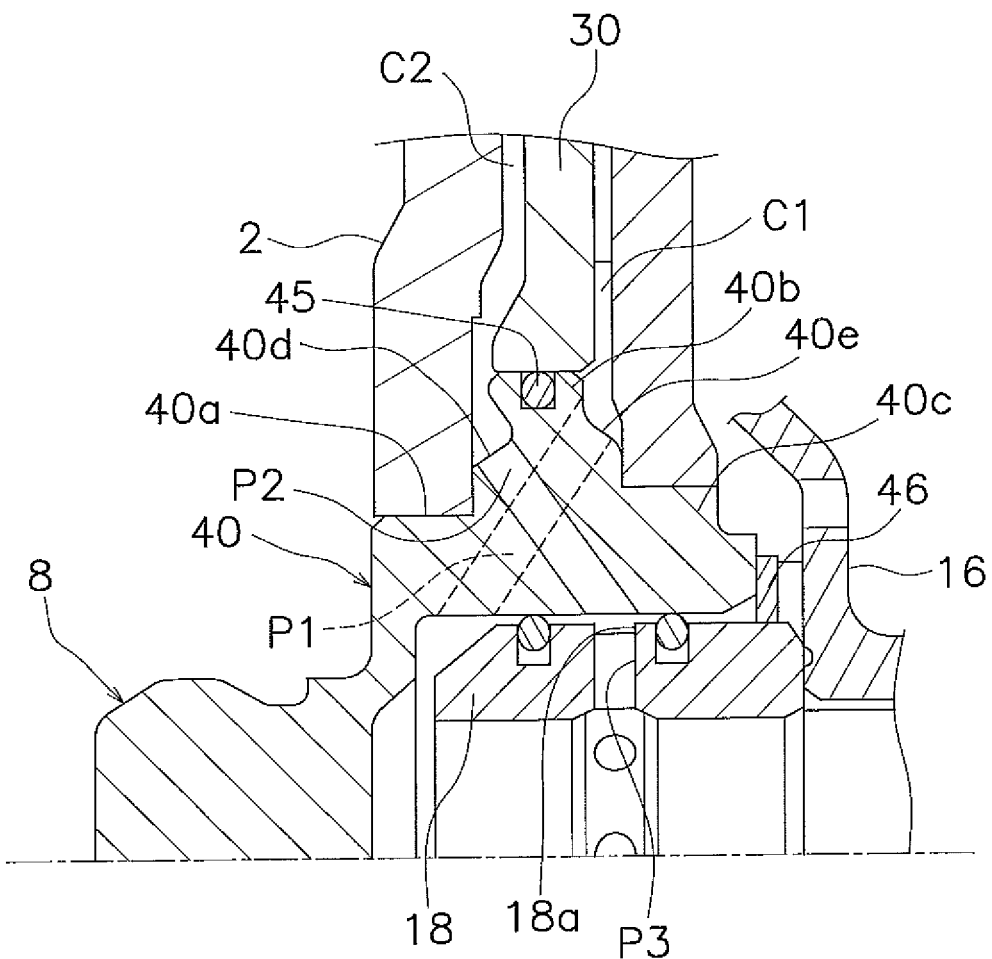
FIG. 6 is an enlarged view of part extracted from FIG. 1.

As shown in FIGS. 2 and 6, the support boss 40 is fixed to the inner peripheral part of the front cover 2. Specifically, the support boss 40 is part of the center boss 8, and is made in the shape of a tube axially extending from the turbine 4-side end of the center boss 8. The support boss 40 includes a first fixation part 40a, a piston support part 40b, a second fixation part 40c, a first intermediate part 40d and a second intermediate part 40e. It should be noted that FIG. 6 is a partial enlarged view of FIG. 1.

The inner peripheral end surface of the front cover 2 is fixed to the outer peripheral surface of the first fixation part 40a by welding. In other words, the inner peripheral end surface of the front cover 2 is inserted and fixed onto the outer peripheral surface of the first fixation part 40a, whereby the front cover 2 is axis-aligned with respect to the center boss 8.

The piston support part 40b has an outer diameter larger than that of the first fixation part 40a. The inner peripheral end surface of the piston 30 is supported by the outer peripheral surface of the piston support part 40b so as to be slidable thereon. Additionally, a seal member 45 is attached to the outer peripheral surface of the piston support part 40b. The seal member 45 seals between the outer peripheral surface of the piston support part 40b and the inner peripheral end surface of the piston 30. It should be noted that the front cover 2-side lateral surface of the piston support part 40b tilts to gradually separate away from the front cover 2 side to the inner peripheral side.

The second fixation part 40c has an outer diameter smaller than that of the piston support part 40b. In other words, the piston support part 40b and the second fixation part 40c compose a step. The inner peripheral end surface of the cover plate 41 is fixed to the outer peripheral surface of the second fixation part 40c by welding. Even when the cover plate 41 is welded to the second fixation part 40c, welding-related strain of the piston support part 40b can be inhibited by setting the outer diameter of the second fixation part 40c to be smaller than that of the piston support part 40b to which the seal member 45 is attached. Therefore, sealing performance between the piston support part 40b and the piston 30 is enhanced.

The first intermediate part 40d is provided between the first fixation part 40a and the piston support part 40b. The outer peripheral surface of the first intermediate part 40d tilts such that the diameter thereof gradually increases from the front cover 2 side to the turbine 4 side. The minimum diameter of the outer peripheral surface of the first intermediate part 40d is larger than the diameter of the first fixation part 40a, while the maximum diameter thereof is smaller than the diameter of the piston support part 40b.

The second intermediate part 40e is provided between the piston support part 40b and the second fixation part 40c. The outer peripheral surface of the second intermediate part 40e tilts such that the diameter thereof gradually reduces from the front cover 2 side to the turbine 4 side. The maximum diameter of the outer peripheral surface of the second intermediate part 40e is smaller than the diameter of the piston support part 40b, while the minimum diameter thereof is larger than the diameter of the second fixation part 40c.

It should be noted that a thrust washer 46 is disposed between the turbine 4-side end surface of the support boss 40 and the turbine hub 16. The thrust washer 46 includes at least one radially penetrating groove on a surface thereof.

—Cover Plate 41—

The cover plate 41 is disposed such that the pressure receiving part 30a of the piston 30 is interposed between the cover plate 41 and the front cover 2. As shown in FIG. 2, the cover plate 41 includes a body 41a, a seal part 41b and a torque transmission part 41c.

The body 41a has a disc shape, and as described above, the inner peripheral end surface thereof is fixed to the outer peripheral surface of the second fixation part 40c of the support boss 40 by welding.

The seal part 41b is included in the outer peripheral part of the body 41a, and includes a recess 41d dented therefrom toward the turbine 4. The first protruding part 30b of the piston 30 is inserted into the recess 41d. A seal member 47 is attached to the outer peripheral part of the first protruding part 30b, and the outer peripheral part thereof makes contact with the inner peripheral surface of the recess 41d. Therefore, a lock-up oil chamber C1 is formed between the piston 30 and the cover plate 41 by the seal member 47.

Figure 7:
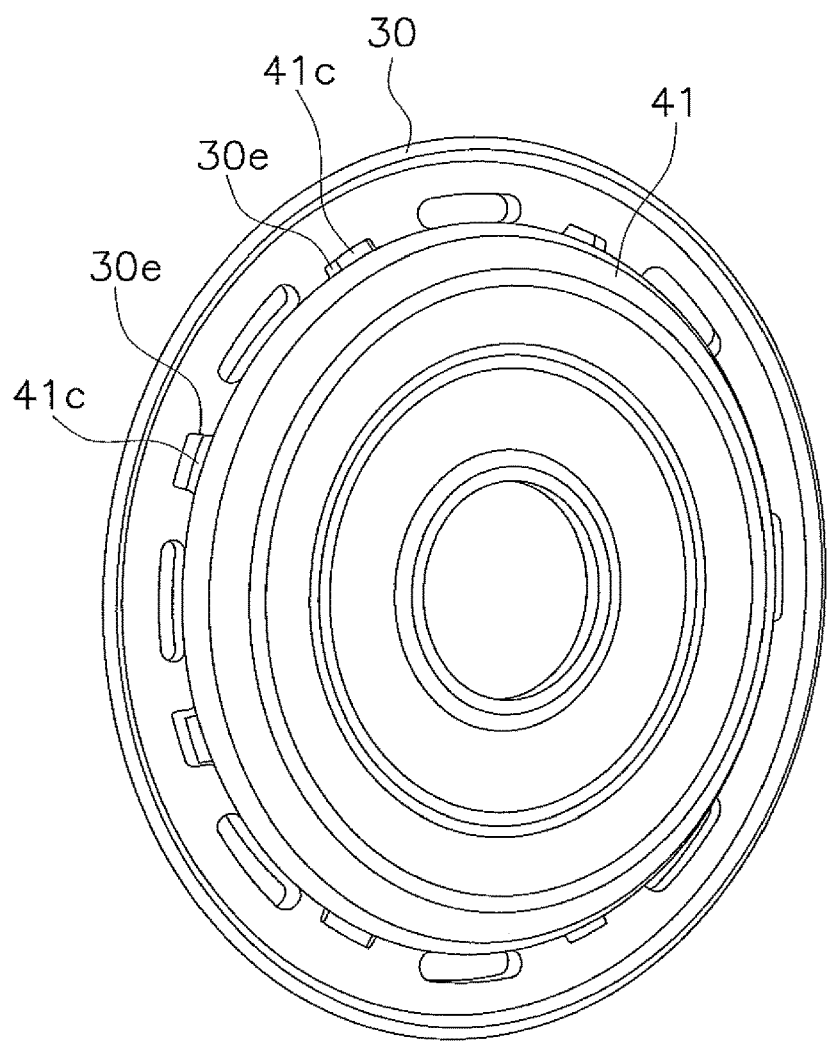
FIG. 7 is an external perspective view of an engaging structure between the piston and the cover plate.

The torque transmission part 41c is provided on the further outer peripheral side of the seal part 41b. The torque transmission part 41c is composed of a plurality of engaging protrusions (hereinafter referred to as "engaging protrusions 41c") extending from the outer peripheral part of the seal part 41b to the front cover side. As shown in FIGS. 4 and 5, the engaging protrusions 41c penetrate the openings 30e provided in the piston 30, and are engaged with the grooves 29a provided on the inner peripheral end of the pressure plate 29. FIG. 7 shows a perspective view of the cover plate 41 and the piston 30 as seen from the turbine 4 side.

With the configuration described above, a torque transmitted to the cover plate 41 can be transmitted to the pressure plate 29. Additionally, rotation of the piston 30 relative to the cover plate 41 can be restricted by appropriately setting the circumferential dimension of each of the engaging protrusions 41c as the torque transmission part and the circumferential dimension of each of the openings 30e of the piston 30.

—Return Mechanism 42—

Figure 8:
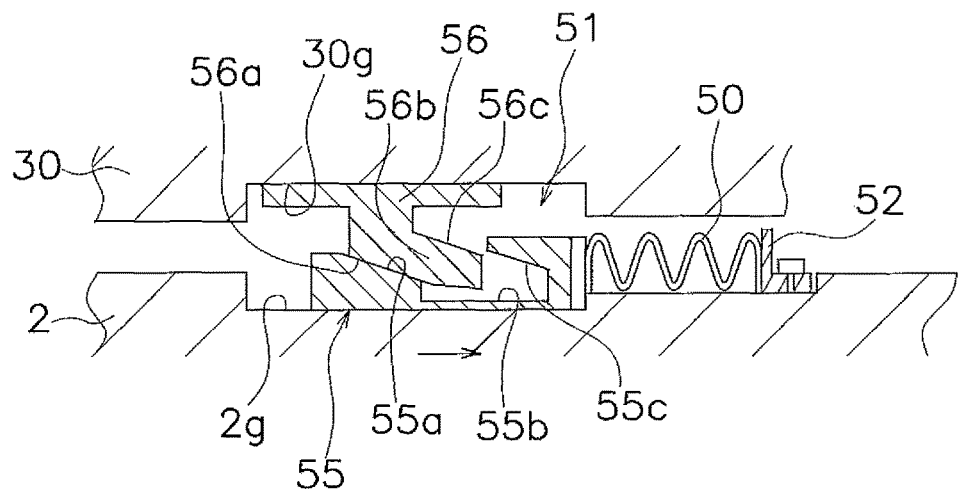
FIG. 8 is a cross-sectional plan view of a return mechanism.
Figure 8:
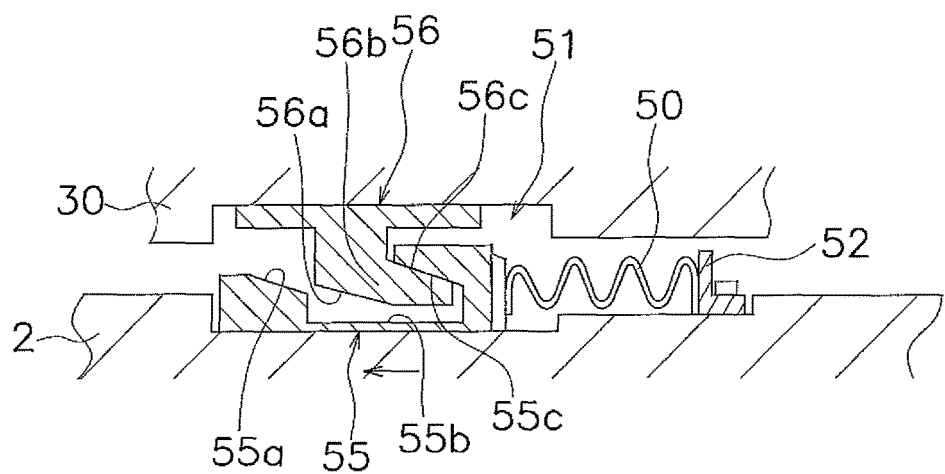

As shown in FIGS. 2 and 8, the return mechanism 42 is disposed between the front cover 2 and the piston 30. FIG. 8 is a cross-sectional plan view showing part of both the front cover 2 and the piston 30, in which the return mechanism 42 is disposed, as seen from the outer peripheral side. Specifically, the return mechanism 42 is disposed between a recess 2g provided on the piston 30-side lateral surface of the front cover 2 and a recess 30g provided on the front cover 2-side lateral surface of the piston 30. The return mechanism 42 is a mechanism that urges the piston 30 in a direction separating from the friction surface of the front cover 2. The return mechanism 42 urges the piston 30 in the direction separating from the front cover 2 and adjusts the gap between the friction surface 2b of the front cover 2 and the pressure applying part 30f of the piston 30. As shown in FIG. 8, the return mechanism 42 is composed of a return spring 50 made of bimetal (a temperature detection member) and a cam mechanism 51 (a gap adjustment mechanism).

The return spring 50 is disposed to extend in the right-and-left direction between a support member 52 fixed to the front cover 2 and one end of the cam mechanism 51. As shown in FIG. 8(a), when the temperature of hydraulic oil is low, the return spring 50 deforms such that the spring length thereof becomes short. On the other hand, as shown in FIG. 8(b), when the temperature of hydraulic oil is high, the return spring 50 deforms such that the spring length thereof becomes long.

The cam mechanism 51 includes a first cam member 55 fixed to the recess 2g of the front cover 2 and a second cam member 56 fixed to the recess 30g of the piston 30.

The first cam member 55 is a member made in the shape of a block extending in the right-and-left direction, and includes a first slope 55a, a groove 55b and a second slope 55c. The first slope 55a is provided on the outer peripheral surface of one end of the first cam member 55 and slants such that the thickness thereof gradually reduces from one end thereof to the other end thereof. The groove 55b is provided on the other end side of the first slope 55a, has a predetermined width, and penetrates in the radial direction. The second slope 55c is provided on the inner peripheral surface of a protruding part provided to cover part of the groove 55b on the other end side. The second slope 55c slants in the same direction as the first slope 55a. One end of the return spring 50 is fixed to the other end surface of the first cam member 55.

The second cam member 56 is a member made in the shape of a block extending in the right-and-left direction, and includes a first slope 56a, an engaging part 56b and a second slope 56c. The engaging part 56b is a part of the second cam member 56 and protrudes toward the first cam member 55. The engaging part 56b is capable of being inserted into the groove 55b of the first cam member 55. Additionally, the first slope 56a is provided on the first cam member 55-side part of the engaging part 56b, and slants in the same direction at the same angle as the first slope 55a of the first cam member 55. Moreover, the first slopes 55a and 56a of both cam members 55 and 56 are slidable in contact with each other. On the other hand, the second slope 56c is provided on the engaging part 56b so as to be located on the opposite side of the first slope 56a, and slants in the same direction at the same angle as the second slope 55c of the first cam member 55. Additionally, the second slopes 55c and 56c of both cam members 55 and 56 are slidable in contact with each other.

—Working of Return Mechanism 42—

In the return mechanism 42 described above, when the atmosphere temperature is low, the return spring 50 contracts as shown in FIG. 8(a). Therefore, in FIG. 8(a), the first cam member 55 is moved rightward with respect to the second cam member 56. Accordingly, the piston 30 is moved to separate from the front cover 2 by sliding between the first slopes 55a and 56a of the first and second cam members 55 and 56. Therefore, the gap between the piston 30 and the front cover 2, in other words, the gap of the part that the clutch disc 28 is provided (the release allowance of the clutch disc 28) is increased. Consequently, the drag torque can be inhibited low in the part inclusive of the clutch disc 28.

On the other hand, when the atmosphere temperature becomes high, and for instance, becomes a room temperature, the return spring 50 expands as shown in FIG. 8(b). Therefore, in FIG. 8(b), the first cam member 55 is moved leftward with respect to the second cam member 56. Accordingly, the piston 30 is moved to approach to the front cover 2 by sliding between the second slopes 55c and 56c of the first and second cam members 55 and 56. Therefore, the gap between the piston 30 and the front cover 2, in other words, the gap of the part that the clutch disc 28 is provided (the release allowance of the clutch disc 28) is reduced. Consequently, a lock-up on state can be quickly made.

<Hydraulic Circuit>

With the configuration of the piston actuation mechanism 31, as shown in FIG. 2, the lock-up oil chamber C1 is formed between the pressure receiving part 30a of the piston 30 and the body 41a of the cover plate 41. Additionally, the front cover 2 includes a step part 2c, having an axially extending tubular shape, between the radially intermediate part thereof and the inner peripheral part thereof. A seal member 57 is attached to the outer peripheral surface of the step part 2c. The seal member 57 makes contact with the inner peripheral surface of the second protruding part 30c of the piston 30. Therefore, a cancellation oil chamber C2 is formed between the pressure receiving part 30a of the piston 30 and the front cover 2 so as to cancel the hydraulic pressure to be generated in the lock-up oil chamber C1 when the lock-up off state is made. It should be noted that the seal member 57, attached to the step part 2c of the front cover 2, exerts sealing performance inferior to that of a normal seal member (e.g., the seal member 47 attached to the first protruding part 30b). Specifically, even when the seal member 57 is attached to the step part 2c, the gap of the part that the seal member 57 is abutted to the object thereof is set to be wider than a normally set gap. Therefore, a larger amount of hydraulic oil leaks in the part that the seal member 57 is attached than in the other sealed parts.

As shown in FIGS. 2 and 6, the support boss 40 includes a first oil passage P1 and a second oil passage P2, both of which radially penetrate therethrough. The first oil passage P1 is opened in the slope of the second intermediate part 40e of the support boss 40, and the lock-up oil chamber C1 and the space of the inner peripheral part of the support boss 40 are communicated therethrough. The second oil passage P2 is opened in the slope of the first intermediate part 40d, and the cancellation oil chamber C2 and the space of the inner peripheral part of the support boss 40 are communicated therethrough. The collar 18 includes a groove 18a having an annular shape, and the groove 18a includes a plurality of third oil passages P3 radially penetrating therethrough. Additionally, the second oil passage P2 is communicated with the third oil passages P3.

<Damper Mechanism 34>

Figure 9:
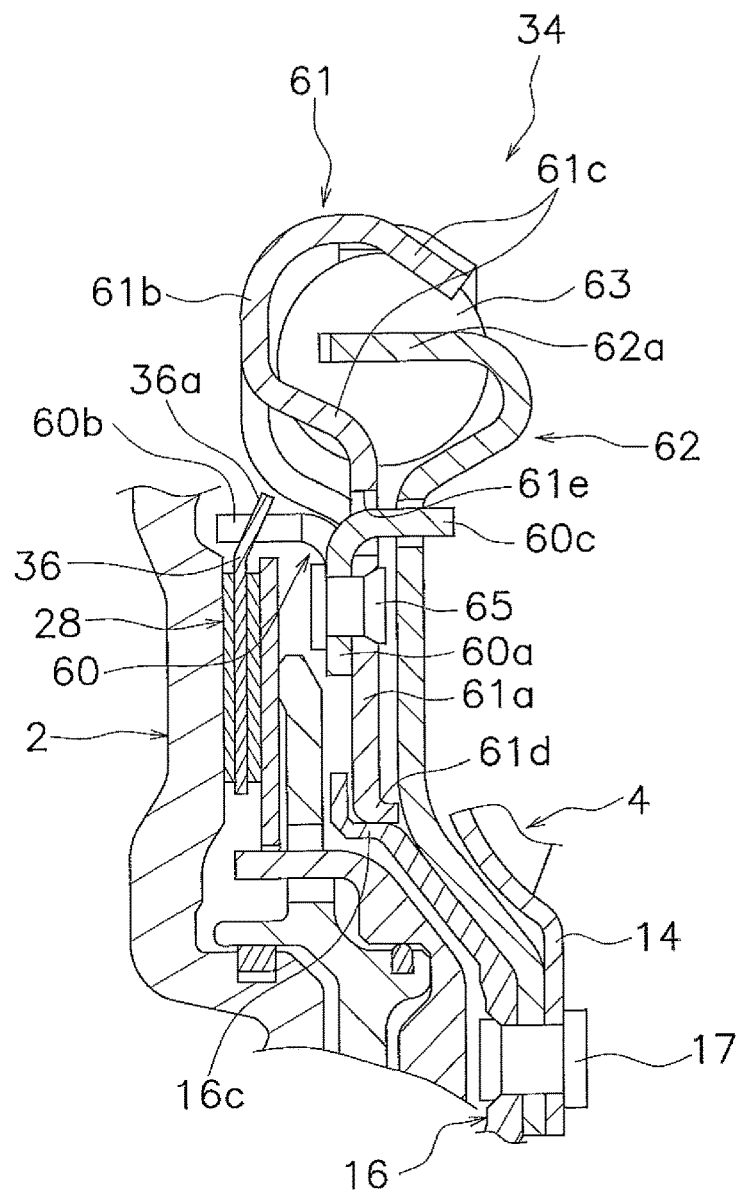
FIG. 9 is a cross-sectional configuration diagram for explaining a damper mechanism.

The damper mechanism 34 is a mechanism disposed between the clutch disc 28 and the turbine 4 so as to transmit a torque from the clutch disc 28 to the turbine 4. As shown in FIG. 9, the damper mechanism 34 includes an engaging member 60, a drive plate 61, a driven plate 62 and a plurality of torsion springs 63.

The engaging member 60 includes a fixed part 60a, a plurality of first engaging parts 60b and a plurality of second engaging parts 60c. The fixed part 60a has an annular shape and is fixed to the drive plate 61 by rivets 65. The plural first engaging parts 60b are formed by bending the outer peripheral end of the fixed part 60a toward the front cover 2, and are meshed with the engaging protrusions 36a provided on the outer periphery of the core plate 36 of the clutch disc 28. The clutch disc 28 is axially movable with respect to the first engaging parts 60b, but is prevented from rotating relatively thereto. The plural second engaging parts 60c are formed by bending the outer peripheral end of the fixed part 60a toward the turbine 4.

The drive plate 61 has an annular shape, and is disposed between the piston 30 and the turbine 4. The drive plate 61 transmits a torque, transmitted to the engaging member 60, to the torsion springs 63. The drive plate 61 includes a disc part 61a, a plurality of support parts 61b and a plurality of engaging parts 61c.

The inner peripheral end surface of the disc part 61a is bent toward the turbine 4, and is provided as a positioning part 61d. The positioning part 61d is supported by the damper support part 16c provided on the outer peripheral end of the turbine hub 16, and is positioned in the radial direction and the axial direction. The disc part 61a includes holes 61e axially penetrating the outer peripheral part thereof. The second engaging parts 60c of the engaging member 60 extend toward the turbine 4 while penetrating the holes 61e.

The support parts 61b are included in the outer peripheral part of the disc part 61a and have a C-shaped cross-section. The plural torsion springs 63 are accommodated in the support parts 61b, and are restricted from moving in the radial direction and from moving toward the front cover 2 by the support parts 61b.

The engaging parts 61c are included in the outer peripheral part of the disc part 61a, and each is provided between adjacent two of the support parts 61b. The engaging parts 61c are partially engaged with both end surfaces of the torsion springs 63 accommodated in the support parts 61b.

The driven plate 62 has a roughly disc shape, and is disposed between the drive plate 61 and the turbine 4. The driven plate 62 is a member that transmits a torque, transmitted to the torsion springs 63, to the turbine hub 16. The driven plate 62 is fixed at the inner peripheral end thereof to the turbine shell 14 and the turbine hub 16 by the rivets 17. Additionally, the driven plate 62 extends to the outer peripheral side along the lateral surface of the turbine shell 14. Engaging parts 62, included in the outer peripheral part of the drive plate 62, are engaged with both end surfaces of the torsion springs 63.

Actions

For lock-up releasing (the lock-up off state) in the lock-up device 7, the lock-up oil chamber C1 is connected to a drain. Therefore, the hydraulic oil inside the lock-up oil chamber C1 is returned to a tank side through the first oil passage P1. In this condition, a pressing force applied to the pressure plate 29 from the pressure applying part 30f of the piston 30 is released. Therefore, the lock-up off state (the power transmission deactivated state) is made, and the torque from the front cover 2 is transmitted from the impeller 3 to the turbine 4 through the hydraulic oil, and is transmitted to the input shaft of the transmission through the turbine hub 16.

It should be noted that when the lock-up off state is made, chances are that a centrifugal force acts on the hydraulic oil remaining in the lock-up oil chamber C1 whereby the piston 30 is pressed toward the front cover 2. When the piston 30 is moved toward the front cover 2, the drag torque due to the clutch disc 28 is increased.

To cope with this, in the present device, as described above, the amount of leakage through the seal member 57 is set to be larger than that through a normal seal member. With this setting, the hydraulic oil leaking through the seal member 57 intrudes into the cancellation oil chamber C2, whereby the piston 30 is inhibited from moving toward the front cover 2. In other words, the pressing force acting on the piston 30 due to the centrifugal force acting on the hydraulic oil in the lock-up oil chamber C1 is configured to be canceled by the hydraulic oil leaking through the seal member 57 into the cancellation oil chamber C2.

On the other hand, when the lock-up on state (a power transmission activated state) is made in the lock-up device 7, the cancellation oil chamber C2 is connected to the drain, and simultaneously, the hydraulic oil is supplied to the lock-up oil chamber C1. In other words, the hydraulic oil is supplied to the end surface of the collar 18, and simultaneously, the hydraulic oil is supplied to the lock-up oil chamber C1 through the first oil passage P1. The piston 30 is thereby moved toward the front cover 2, and moves the pressure plate 29 toward the front cover 2. Accordingly, the clutch disc 28 is interposed and held between the front cover 2 and the pressure plate 29, and the lock-up on state is made.

When the lock-up on state is made, the torque from the front cover 2 is transmitted to the damper mechanism 34 through a path of "the support boss 40→the cover plate 41→the pressure plate 29→the clutch disc 28", and is also transmitted from the front cover 2 to the damper mechanism 34 through the clutch disc 28.

In the aforementioned torque transmission path, a torque is transmitted between the cover plate 41 and the pressure plate 29 by meshing between the engaging protrusions 41c and the grooves 29a. A gap exists between each engaging protrusion 41c and each groove 29a, whereby clicking sound is produced. The clicking sound is supposed to be transmitted to the front cover 2 and then leak to the outside. However, in the device of the present exemplary embodiment, a long transmission path is set between the front cover 2 and the parts that the clicking sound is produced (engaging parts between the engaging protrusions 41c and the grooves 29a). Hence, the clicking sound is attenuated until transmitted to the front cover 2. Therefore, the clicking sound becomes unlikely to leak to the outside.

In the damper mechanism 34, the torque inputted to the engaging member 60 is transmitted to the turbine 4 through the torsion springs 63 and the driven plate 62, and is further transmitted to the input shaft of the transmission through the turbine hub 16.

During actuation of the lock-up device 7 described above, the front cover 2 has chances of being deformed by the pressure of hydraulic oil and/or the centrifugal force such that the inner peripheral part thereof further expands than the outer peripheral part thereof. When the clutch disc 28 is pressed in contact with the front cover 2 while the front cover 2 (especially, the friction surface 2b) is deformed, it is concerned that the clutch disc 28 locally makes contact with the front cover 2 without entirely making contact therewith and is thereby abnormally abraded.

However, in the present device, the relation "the piston 30>the pressure plate 29>the core plate 36" is set regarding the bending stiffness of the core plate 36, that of the pressure plate 29, and that of the piston 30. Hence, even when the front cover 2 is deformed, the pressure plate 29 and the clutch disc 28 are configured to be deformed in accordance with deformation of the front cover 2 by pressing the pressure plate 29 and the clutch disc 28 with the piston 30. With this configuration, the clutch disc 28 can be inhibited from being abnormally abraded.

Other Exemplary Embodiments

The present disclosure is not limited to the exemplary embodiment described above, and a variety of changes or modifications can be made without departing from the scope of the present disclosure.

In the aforementioned exemplary embodiment, the clutch part is composed of the clutch disc 28. However, for instance, a friction member may be fixed to the lateral surface of the pressure plate, and the friction member may be configured to be pressed in contact with the friction surface 2b of the front cover 2. In this case, a clutch disc can be omitted.

On the other hand, the return mechanism for separating the piston from the front cover may be disposed between the piston and the cover plate.

INDUSTRIAL APPLICABILITY

In the lock-up device of the present disclosure, a gap of a clutch part can be appropriately set in accordance with temperatures, and in addition, flexibility in design of a mechanism for appropriately setting the gap of the clutch part can be enhanced.

REFERENCE SIGNS LIST

2 Front cover
2b Friction surface
4 Turbine
28 Clutch disc

29 Pressure plate
30 Piston
34 Damper mechanism
40 Support boss
40b Piston support part
40c Second fixation part (coupling part)
41 Cover plate (oil chamber plate)
50 Return spring made of bimetal (temperature detection member)
51 Cam mechanism (gap adjustment mechanism)
C1 Lock-up oil chamber
C2 Cancellation oil chamber
P1 First oil passage
P2 Second oil passage
P3 Third oil passage

The invention claimed is:

1. A lock-up device for a torque converter, the lock-up device for transmitting a torque from a front cover to a transmission-side member through a turbine of the torque converter, the lock-up device comprising:
   a clutch disc disposed between the front cover and the turbine;
   a piston disposed in opposition to the front cover through the clutch disc so as to be movable in an axial direction, the piston configured to press the clutch disc toward the front cover;
   a temperature detection member that a deformation amount thereof is adjusted in accordance with surrounding temperatures; and
   a gap adjustment mechanism including a first member fixed to the front cover and a second member fixed to the piston,
   the gap adjustment mechanism configured to adjust a gap between the front cover and the piston to be a first gap at a first temperature in accordance with the deformation amount of the temperature detection member, the gap adjustment mechanism further configured to adjust the gap between the front cover and the piston to be a second gap narrower than the first gap at a second temperature higher than the first temperature in accordance with the deformation amount of the temperature detection member.

2. The lock-up device for a torque converter according to claim 1, wherein the temperature detection member and the gap adjustment mechanism are disposed between the front cover and the piston.

3. The lock-up device for a torque converter according to claim 1, further comprising:
   an oil chamber plate disposed between the piston and the turbine, wherein
   the piston and the oil chamber plate form a lock-up oil chamber therebetween, the lock-up oil chamber to be supplied with a hydraulic oil for moving the piston toward the front cover.

4. The lock-up device for a torque converter according to claim 3, wherein
   the front cover and the piston form a cancellation oil chamber therebetween so as to cancel a hydraulic pressure to be generated in the lock-up oil chamber in lock-up releasing, and
   the temperature detection member and the gap adjustment mechanism are disposed in the cancellation oil chamber.

5. The lock-up device for a torque converter according to claim 4, further comprising:
   a support boss having an annular shape, the support boss fixed to an inner peripheral part of the front cover, the support boss including a piston support part and a coupling part, the piston support part configured to support an inner peripheral end surface of the piston such that the piston is slidable thereon, the coupling part configured to receive an inner peripheral part of the oil chamber plate coupled thereto, wherein
   the support boss includes an oil passage communicated with the lock-up oil chamber and an oil passage communicated with the cancellation oil chamber.

6. The lock-up device for a torque converter according to claim 1, wherein
   the front cover includes a friction surface with which the clutch disc is to be pressed in contact, and
   the lock-up device further comprises a pressure plate disposed in opposition to the friction surface through the clutch disc, the pressure plate to be pressed by the piston.

7. The lock-up device for a torque converter according to claim 1, further comprising:
   a damper mechanism configured to transmit the torque from the clutch disc to the turbine, the damper mechanism configured to absorb and attenuate a torsional vibration.

* * * * *